(12) United States Patent  
Wadehn

(10) Patent No.: US 8,536,726 B2  
(45) Date of Patent: Sep. 17, 2013

(54) ELECTRICAL MACHINES, WIND TURBINES, AND METHODS FOR OPERATING AN ELECTRICAL MACHINE

(75) Inventor: Jörg Wadehn, Trige (DK)

(73) Assignee: Vestas Wind Systems A/S, Randers SV (DK)

( * ) Notice: Subject to any disclaimer, the term of this patent is extended or adjusted under 35 U.S.C. 154(b) by 387 days.

(21) Appl. No.: 12/885,033

(22) Filed: Sep. 17, 2010

(65) Prior Publication Data

US 2012/0068472 A1 Mar. 22, 2012

(51) Int. Cl.
*F03D 9/00* (2006.01)
*H02P 9/04* (2006.01)
*F02B 63/04* (2006.01)
*H02K 7/10* (2006.01)
*H02K 7/18* (2006.01)

(52) U.S. Cl.
USPC ................................ 290/55; 290/1 C; 290/44

(58) Field of Classification Search
USPC .............................................. 290/1 C, 44, 55
See application file for complete search history.

(56) References Cited

U.S. PATENT DOCUMENTS

| | | | | |
|---|---|---|---|---|
| 3,303,713 A * | 2/1967 | Hicks | | 74/411 |
| 4,291,233 A | 9/1981 | Kirschbaum | | 290/1 C |
| 5,663,600 A | 9/1997 | Baek et al. | | 290/55 |
| 6,232,673 B1 | 5/2001 | Schoo et al. | | 290/55 |
| 6,304,002 B1 | 10/2001 | Dehlsen et al. | | 290/1 C |
| 7,154,191 B2 | 12/2006 | Jansen et al. | | 290/55 |
| 7,297,086 B2 * | 11/2007 | Fox | | 475/331 |
| 7,815,536 B2 * | 10/2010 | Jansen et al. | | 475/159 |
| 8,192,323 B2 * | 6/2012 | Fox | | 475/347 |
| 8,376,902 B2 * | 2/2013 | Fox et al. | | 475/347 |
| 8,393,994 B2 * | 3/2013 | Bech et al. | | 475/346 |
| 8,414,448 B2 * | 4/2013 | Madge et al. | | 475/348 |
| 8,425,374 B2 | 4/2013 | Smook | | 475/348 |
| 8,430,788 B2 * | 4/2013 | Fox et al. | | 475/347 |
| 2003/0015052 A1 | 1/2003 | Hulshof | | 74/410 |
| 2003/0222456 A1 | 12/2003 | Mikhall et al. | | 290/1 R |
| 2004/0237683 A1 | 12/2004 | Mikhail et al. | | 74/410 |
| 2005/0012339 A1 | 1/2005 | Mikhail et al. | | 290/44 |
| 2006/0104815 A1 | 5/2006 | Siegfriedsen | | 416/170 R |
| 2006/0205557 A1 | 9/2006 | Arndt et al. | | 475/331 |
| 2007/0108776 A1 | 5/2007 | Siegfriedsen | | 290/55 |
| 2007/0238575 A1 * | 10/2007 | Wang et al. | | 475/331 |
| 2008/0315697 A1 | 12/2008 | Bonnet | | 310/83 |
| 2009/0058094 A1 * | 3/2009 | Jansen et al. | | 290/55 |

(Continued)

FOREIGN PATENT DOCUMENTS

DE 10318945 B3 10/2004
EP 0811764 A1 12/1997

(Continued)

*Primary Examiner* — Pedro J Cuevas
(74) *Attorney, Agent, or Firm* — Patterson & Sheridan, LLP

(57) ABSTRACT

Electrical machines, wind turbines, and methods of operating an electrical machine. The electrical machine includes first and second rotatable members that are configured to convert mechanical energy received from the wind turbine rotor into electrical energy. The first rotatable member is coupled with the wind turbine rotor and the second rotatable member is coupled by a gear train with the wind turbine rotor. The gear train, which is driven by rotation of the wind turbine rotor, rotates the second rotatable member relative to the first rotatable member in a direction counter to a direction of rotation of the first rotatable member. The electrical machine may be a generator of the wind turbine.

14 Claims, 6 Drawing Sheets

(56) References Cited

U.S. PATENT DOCUMENTS

| | | |
|---|---|---|
| 2009/0163316 A1 | 6/2009 | Saenz De Ugarte et al. . 475/348 |
| 2009/0233721 A1 | 9/2009 | Saenz De Ugarte et al. ... 464/45 |
| 2009/0289460 A1 | 11/2009 | Bech ................................ 290/55 |
| 2009/0309369 A1 | 12/2009 | Llorente Gonzalez ......... 290/55 |
| 2010/0105512 A1 | 4/2010 | Berger et al. ................. 475/149 |
| 2011/0053730 A1* | 3/2011 | Fox et al. ....................... 475/347 |
| 2011/0082005 A1* | 4/2011 | Fox et al. ....................... 475/347 |
| 2012/0032450 A1* | 2/2012 | Paweletz et al. ............. 290/1 C |
| 2012/0040797 A1* | 2/2012 | Fox ................................ 475/347 |
| 2012/0156034 A1* | 6/2012 | Sabannavar et al. .............. 416/1 |
| 2013/0001958 A1* | 1/2013 | Crane et al. ................... 290/1 R |
| 2013/0009408 A1* | 1/2013 | Crane et al. ................... 290/4 D |
| 2013/0035198 A1* | 2/2013 | Enting et al. ................. 475/344 |
| 2013/0043686 A1* | 2/2013 | Eitan et al. ...................... 290/55 |
| 2013/0052017 A1* | 2/2013 | Madge et al. ............. 416/170 R |
| 2013/0053210 A1* | 2/2013 | Kari et al. ..................... 475/331 |

FOREIGN PATENT DOCUMENTS

| | | |
|---|---|---|
| EP | 1243791 A2 | 9/2002 |
| EP | 1318329 A2 | 6/2003 |
| EP | 2072858 A1 | 6/2009 |
| GB | 2382117 A | 5/2003 |
| JP | 2002303254 A | 10/2002 |
| WO | 9611338 A1 | 4/1996 |
| WO | 2004040740 A1 | 5/2004 |
| WO | 2005075822 A1 | 8/2005 |
| WO | 2008113318 A2 | 9/2008 |
| WO | 2009049599 A2 | 4/2009 |

* cited by examiner

ELECTRICAL MACHINES, WIND TURBINES, AND METHODS FOR OPERATING AN ELECTRICAL MACHINE

TECHNICAL FIELD

This application relates generally to electrical machines, wind turbines, and methods for operating electrical machines.

BACKGROUND

Wind turbines are used to produce electrical energy using a renewable resource and without combusting a fossil fuel. Generally, a wind turbine converts kinetic energy from the wind into mechanical energy and then subsequently converts the mechanical energy into electrical power. A conventional horizontal-axis wind turbine includes a tower, a nacelle located at the apex of the tower, and a rotor that is supported by the nacelle. A shaft couples the rotor either directly or indirectly with a rotor assembly of a generator, which is housed inside the nacelle.

A typical generator, which is a species of conventional electrical machines, includes a stator assembly that is a stationary construct and a rotor assembly that moves relative to the stationary stator assembly. Under the principles of Faraday's Law and Lenz's Law, the relative motion induces electrical currents in wire coils associated with the stator assembly. The power output of the generator is determined by the torque applied to the generator's axis of rotation, which serves as a limitation on the peak power output.

While conventional generators are adequate for their intended purpose, improved generators and other types of electrical machines, as well as improved wind turbines and methods for operating generators and other types of electrical machines, are needed.

SUMMARY

In an embodiment of the invention, an electrical machine is provided that includes a first rotatable member mechanically coupled with a wind turbine rotor, a second rotatable member arranged relative to the first rotatable member, and a gear train coupling the wind turbine rotor with the second rotatable member. The first and second rotatable members are configured to convert mechanical energy received from the wind turbine rotor into electrical energy. The first rotatable member is configured to be rotated in a first direction by the wind turbine rotor. The gear train, which is also driven by the wind turbine rotor, rotates the second rotatable member relative to the first rotatable member in a second direction counter to the first direction.

In another embodiment of the invention, a wind turbine includes a nacelle supported by a tower and a rotor supported by the nacelle. The rotor is configured to convert wind energy into mechanical energy that rotates the rotor about a longitudinal axis. The wind turbine further includes a generator with a first rotatable member mechanically coupled with the wind turbine rotor, a second rotatable member arranged relative to the first rotatable member, and a gear train coupling the wind turbine rotor with the second rotatable member. The first and second rotatable members are configured to convert mechanical energy received from the rotor into electrical energy. The first rotatable member is configured to be rotated in a first direction by the rotor. The gear train, which is also driven by the wind turbine rotor, rotates the second rotatable member relative to the first rotatable member in a second direction counter to the first direction.

In yet another embodiment of the invention, a method is provided for operating an electrical machine having first and second rotatable members configured to convert mechanical energy received from a rotor of a wind turbine into electrical energy. The method includes rotating a first rotatable member in a first direction using torque from the rotor of the wind turbine, and driving a second rotatable member to rotate in a second direction counter to the first direction using the torque from the wind turbine rotor. The relative rotation of the first and second rotatable members is used to convert the mechanical energy received from the wind turbine rotor into the electrical energy.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
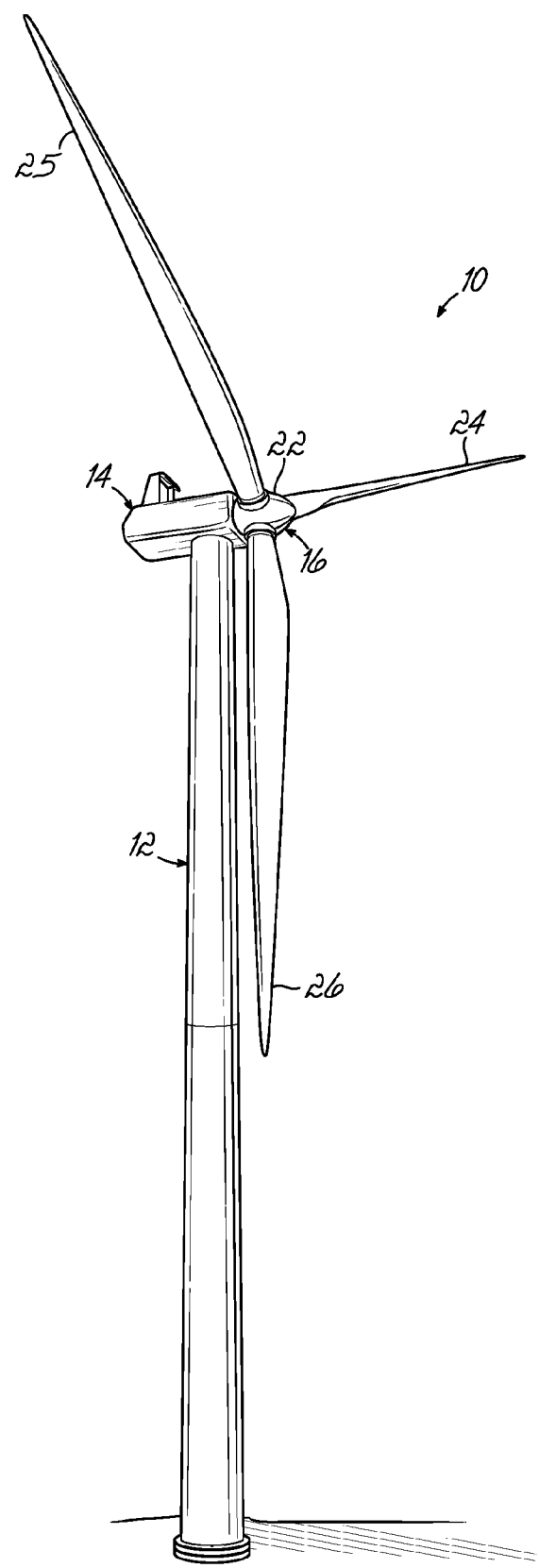
FIG. 1 is a diagrammatic view of a wind turbine.
Figure 2:
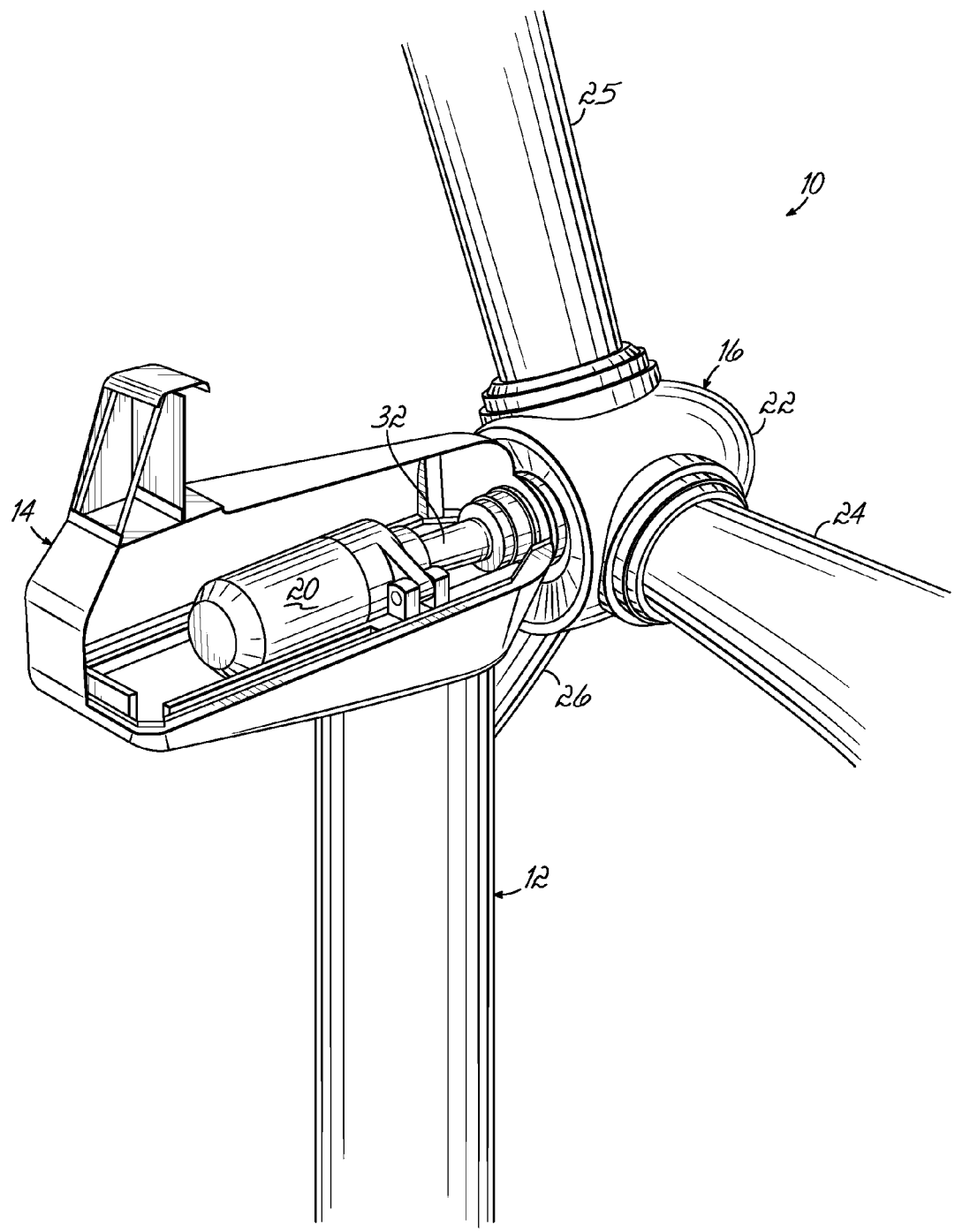
FIG. 2 is a perspective view of a portion of the wind turbine of FIG. 1 in which the nacelle is partially broken away to expose a generator and other structures housed inside the nacelle.

With reference to FIGS. 1 and 2, a wind turbine 10 includes a tower 12, a nacelle 14 disposed at the apex of the tower 12, and a rotor 16 operatively coupled to a generator 20 housed inside the nacelle 14. In addition to the generator 20, the nacelle 14 houses miscellaneous components required for converting wind energy into electrical energy and various components needed to operate, control, and optimize the performance of the wind turbine 10. The tower 12 supports the load presented by the nacelle 14, the rotor 16, and other components of the wind turbine 10 that are housed inside the nacelle 14. The tower 12 of the wind turbine 10 also operates to elevate the nacelle 14 and rotor 16 to a height above ground level or sea level, as may be the case, at which faster moving air currents of lower turbulence are typically found.

The rotor 16 of the wind turbine 10, which is represented as a horizontal-axis wind turbine, serves as the prime mover for the electromechanical system. Wind exceeding a minimum level will activate the rotor 16 and cause rotation in a direction substantially perpendicular to the wind direction.

The wind turbine 10 may be included among a collection of similar wind turbines belonging to a wind farm or wind park that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. Under normal circumstances, the electrical power is supplied from the generator 20 to the power grid as known to a person having ordinary skill in the art.

The rotor 16 of wind turbine 10 includes a central hub 22 and a plurality of blades 24, 25, 26 that project outwardly from the central hub 22 at locations circumferentially distributed about the central hub 22. In the representative embodiment, the rotor 16 includes three blades 24, 25, 26 but the number may vary. The blades 24, 25, 26 are configured to interact with the passing air flow to produce lift that causes the central hub 22 to spin about a longitudinal axis. The design and construction of the blades 24, 25, 26 are familiar to a person having ordinary skill in the art. For example, each of the blades 24, 25, 26 is connected to the central hub 22 through a pitch mechanism that allows the blade to pitch under control of a pitch controller.

Figure 3:
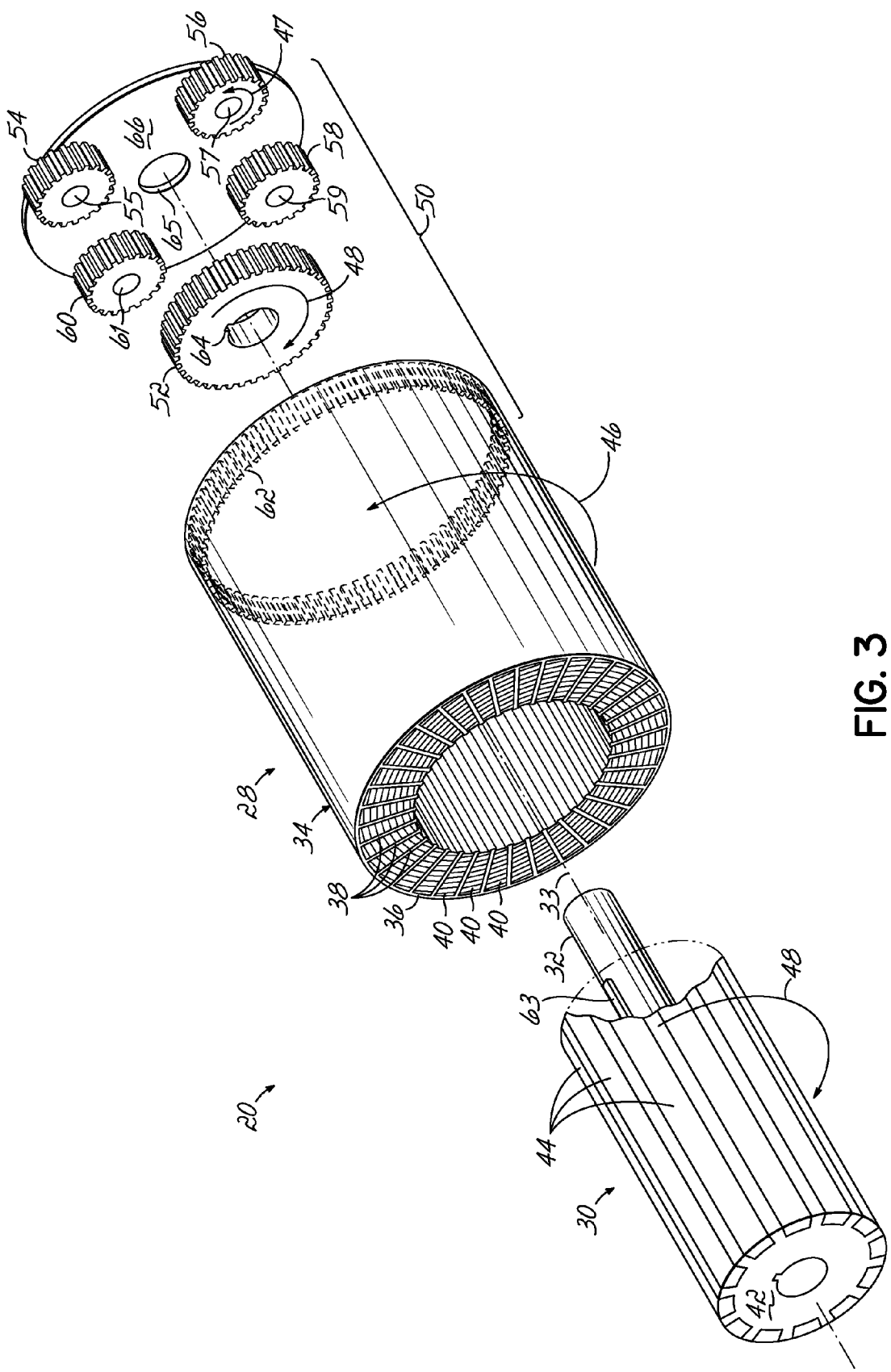
FIG. 3 is an exploded perspective view of the rotor and stator assemblies of the generator of FIG. 2 in which the generator includes a drive train in accordance with an embodiment of the invention.
Figure 4:
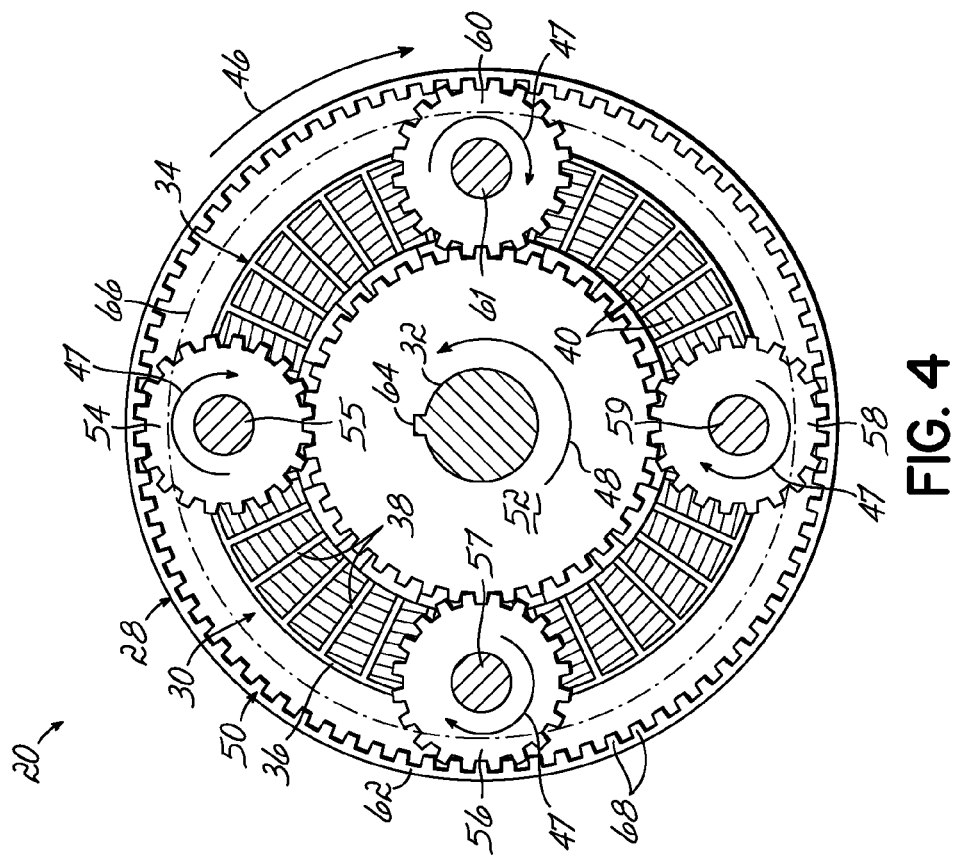
FIG. 4 is a cross-sectional view of the drive train for the assembled generator of FIG. 3.

With reference to FIGS. 3 and 4 and in accordance with an embodiment of the invention, the generator 20 includes a stator assembly 28 and a rotor assembly 30 that have a radial-flux electrical machine configuration and that are housed inside a space enclosed by a casing (not shown). In the representative embodiment, the stator assembly 28 and rotor assembly 30 have a concentric arrangement with the rotor assembly 30 disposed radially inside the stator assembly 28. A rotary drive shaft 32 is connected with the central hub 22 of the rotor 16. The rotary drive shaft 32 is supported on bearings that promote low-friction, free rotation about a longitudinal axis 33.

The stator assembly 28 includes a stator frame 34 with an annular outer yoke 36, a plurality of posts 38 projecting radially inward from the outer yoke 36 toward the rotor assembly 30, and a plurality of armature windings 40 disposed within the slots between adjacent posts 38. The outer yoke 36 and posts 38 may be composed of a ferromagnetic material, and the armature windings 40 include loops or turns of a conductive material that are electrically insulating from each other.

The rotor assembly 30 includes a rotor core or frame 42 and a plurality of magnetic poles 44 circumferentially distributed about the rotor frame 42. The rotor frame 42 is mechanically coupled, such as by a key and keyway, with the rotary drive shaft 32. The rotor assembly 30, which is generally cylindrical in shape, supports the magnetic poles 44 such that an air gap is defined between the magnetic poles 44 and the distal ends of the posts 38 of stator assembly 28. When the wind turbine 10 is operating, the rotor assembly 30 rotates or spins with an angular velocity about the longitudinal axis 33 and in the same rotational direction as the drive shaft 32 as indicated by the single headed arrow 48.

The magnetic poles 44 represent the magnetic field component of the generator 20. Each of the magnetic poles 44 is composed of a permanent magnetic material susceptible to being magnetized by a strong magnetic field and, once magnetized, capable of retaining and generating a sustained high magnetic field. For example, the magnetic poles 44 may be composed of a rare-earth alloy, a ceramic or ferrite material, or alnico. In an alternative embodiment, the magnetic poles 44 may be replaced by field windings. In another alternative embodiment, the spatial correlation of the stator and rotor assemblies 28, 30 may be inverted such that the armature windings are on the rotor assembly 30 and the field windings or permanent magnets are mounted on the stator assembly 28.

The generator 20 includes a drive train, generally indicated by reference numeral 50, that is configured to move the stator assembly 28 relative to the rotor assembly 30, which itself is directly driven by the rotary drive shaft 32. In the representative embodiment, the drive train 50 is an epicyclic gear train that includes a central sun gear 52, a plurality of peripheral planet gears 54, 56, 58, 60 arranged about the outer circumference of the sun gear 52, and an outer annulus gear 62 that is incorporated into the stator assembly 28. The drive train 50 is depicted as positioned between the rotor assembly 30 of the generator 20 and the central hub 22 of the rotor 16, although the invention is not so limited as this arrangement may be modified such that the rotor assembly 30 of the generator 20 is disposed between the drive train 50 and the central hub 22 of the rotor 16.

In an alternative embodiment, the rotary drive shaft 32 may be omitted from the wind turbine construction, and the rotor assembly 30 may be mechanically coupled directly with the central hub 16 in the absence of a rotary drive shaft.

The drive train 50 transmits rotation of the rotary drive shaft 32 as powered rotary motion to the stator frame 34 of the stator assembly 28, as indicated by the single headed arrow 46. As a consequence, the stator assembly 28 rotates in a direction 46 counter or opposite to the direction 48 of rotation of the rotor assembly 30.

The sun gear 52 is connected at the end of the rotary drive shaft 32 by a mechanical coupling, such as the representative key 63 and keyway 64. The teeth of the sun gear 52 are meshed with the teeth of the planet gears 54, 56, 58, 60, which are supported by a face of a planetary carrier 66 on respective mounting posts (i.e., shafts) 55, 57, 59, 61. The planet gears 54, 56, 58, 60 are meshed with inwardly-facing teeth 68 of the outer annulus gear 62, which may be integrally formed in a ring on an inner peripheral surface of the stator frame 34. In the representative embodiment, the planet gears 54, 56, 58, 60 are arranged at an equal circular pitch in the circumferential direction of the sun gear 52. Additionally, the planetary carrier 66 is locked in a stationary position relative to the longitudinal axis 33 such that the planet gears 54, 56, 58, 60 do not revolve about the sun gear 52. The rotary drive shaft 32 extends through a clearance opening 65 in the planetary carrier 66.

In operation, the sun gear 52 is driven by the rotary drive shaft 32. The planet gears 54, 56, 58, 60 axially rotate in the same direction 47 about their respective mounting posts 55, 57, 59, 61 as a result. In turn, the planet gears 54, 56, 58, 60 drive the outer annulus gear 62, along with the stator assembly 28, at an angular velocity in direction 46. The angular velocity for the rotation of the stator assembly 28 and outer annulus gear 62 is proportional to the angular velocity of the rotary drive shaft 32.

Thus, the rotation of the sun gear 52 supplies an input in the form of a torque that powers the drive train 50, and the outer annulus gear 62 is an output receiving power within the drive train 50. In this manner, an input rotation of the rotary drive shaft 32 transferred to the sun gear 52 is converted into an output rotation of the outer annulus gear 62. The planet gears 54, 56, 58, 60 each spin at a rate determined by a gear ratio of the number of teeth on the sun gear 52 to the number of teeth on each of the planet gears 54, 56, 58, 60. The rotation direction of the planet gears 54, 56, 58, 60 is opposite to the rotation direction of the sun gear 52. For example, clockwise rotation of the sun gear 52 produces counterclockwise rotation of the planet gears 54, 56, 58, 60 in a proportion determined by the gear ratio. Rotation of the planet gears 54, 56, 58, 60 drives the outer annulus gear 62 at a rate given by a gear ratio of the number of teeth 68 on the outer annulus gear 62 to the number of teeth on each of the planet gears 54, 56, 58, 60 and in the same rotational direction (e.g., counterclockwise rotation of the planet gears 54, 56, 58, 60 produces counterclockwise rotation of the outer annulus gear 62 at the rate determined by the gear ratio).

With the planetary carrier 66 locked and consolidating the individual gear ratios given above, rotation of the sun gear 52 in one direction 48 causes the outer annulus gear 62 to rotate in the opposite direction 46 with a gear ratio given by the number of teeth on the sun gear 52 to the number of teeth on the outer annulus gear 62. One full rotation of the sun gear 52 produces a partial rotation of the outer annulus gear 62 specified by a fraction equal to the gear ratio.

The relative rotation of the rotor assembly 30 and the stator assembly 28 in opposite directions 46, 48 develops a relative angular velocity therebetween during operation of the generator 20. The relative angular velocity is given by the vector sum of the angular velocity at which the rotor assembly 30 is rotating and the angular velocity of the stator assembly 28. The introduction of the drive train 50 into the generator 20 provides an effective angular velocity at an equivalent angular velocity for the rotary drive shaft 32 that is comparatively greater than the angular velocity of the rotor assembly in a conventional type of generator in which the stator assembly 28 is stationary. Stated differently, the enhanced angular velocity for an equivalent shaft torque received from the rotor 16 increases the output power at that equivalent shaft torque.

The embodiments of the invention may eliminate the conventional need for a separate gearbox or reduce the dimensions and/or complexity of any conventional gearbox that may be present. This may be especially beneficial as the size of the generator is scaled upwardly. The elimination of a separate gearbox or gearbox size/complexity reduction may reduce the weight of the power generation system inside the nacelle and may result in cost savings during design and construction. In addition, maintenance savings may be realized for operating the wind turbine from the design simplification as a consequence of eliminating or reducing the size and/or complexity of the gearbox.

Figure 2A:
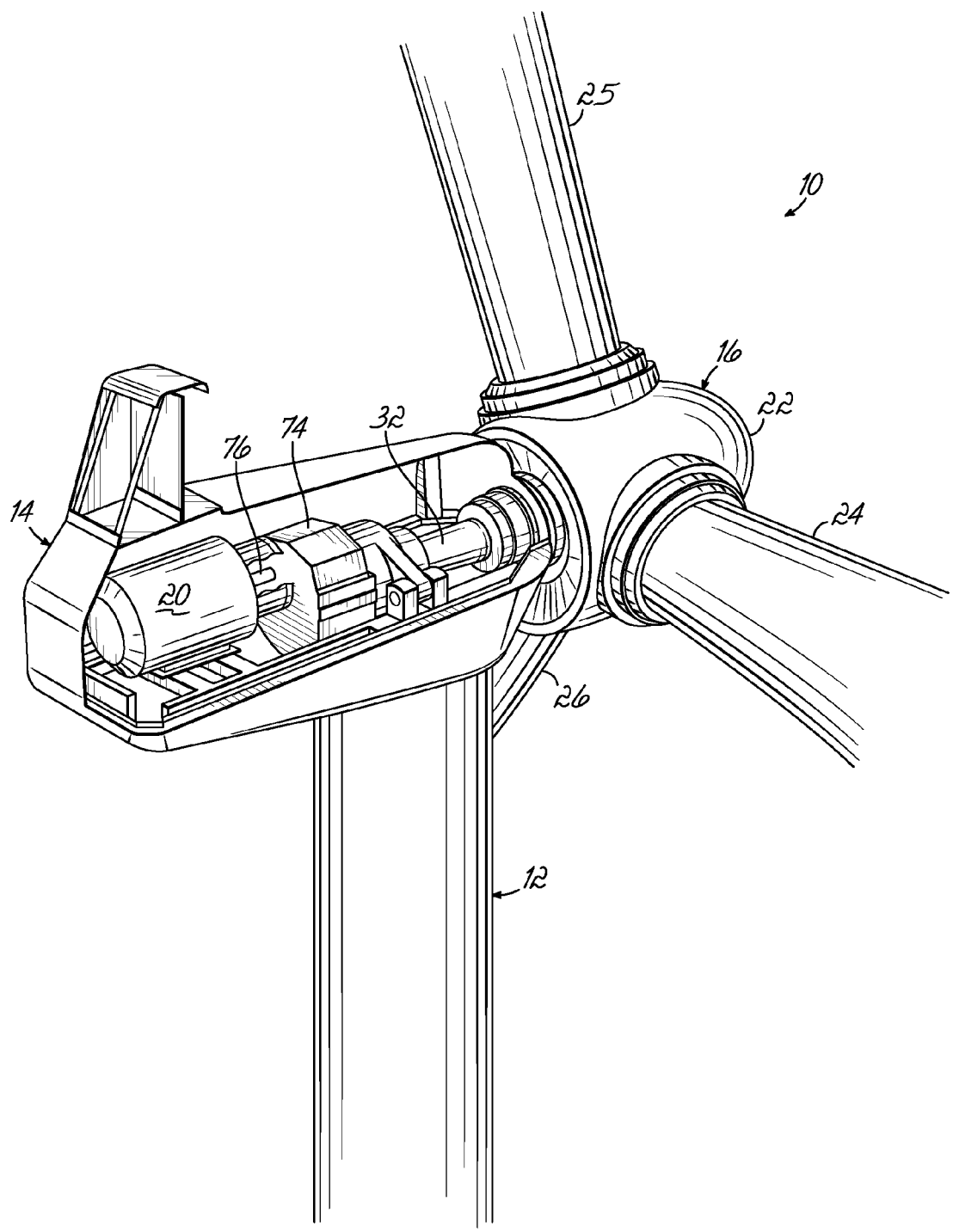
FIG. 2A is a perspective view similar to FIG. 2 of a different wind turbine design including the generator of FIG. 2.

As shown in FIG. 2A, the rotary drive shaft 32 from the rotor 16 may be indirectly connected with the generator 20 through a conventional gearbox 74 that is separate and distinct from the generator 20. The gearbox 74 relies on gear ratios to provide speed and torque conversions that increase the relatively low angular velocity of the rotor 16 and the low-speed rotary drive shaft 32 to enhance the torque supplied to the rotor assembly 30 of the generator 20 and by the drive train 50 to the stator assembly 28 of the generator 20. In this embodiment, the rotor assembly 30 of the generator 20 and the drive train 50 are driven by a secondary high-speed rotary drive shaft 76 that is coupled with the output of the gearbox 74. As disclosed above, the conventional gearbox 74 may have a reduced complexity and size because of the presence of the drive train 50 of the generator 20. For example, the conventional gearbox 74 may be more compact and of a lower complexity construction with fewer stages and/or a lower gear ratio.

Figure 6:
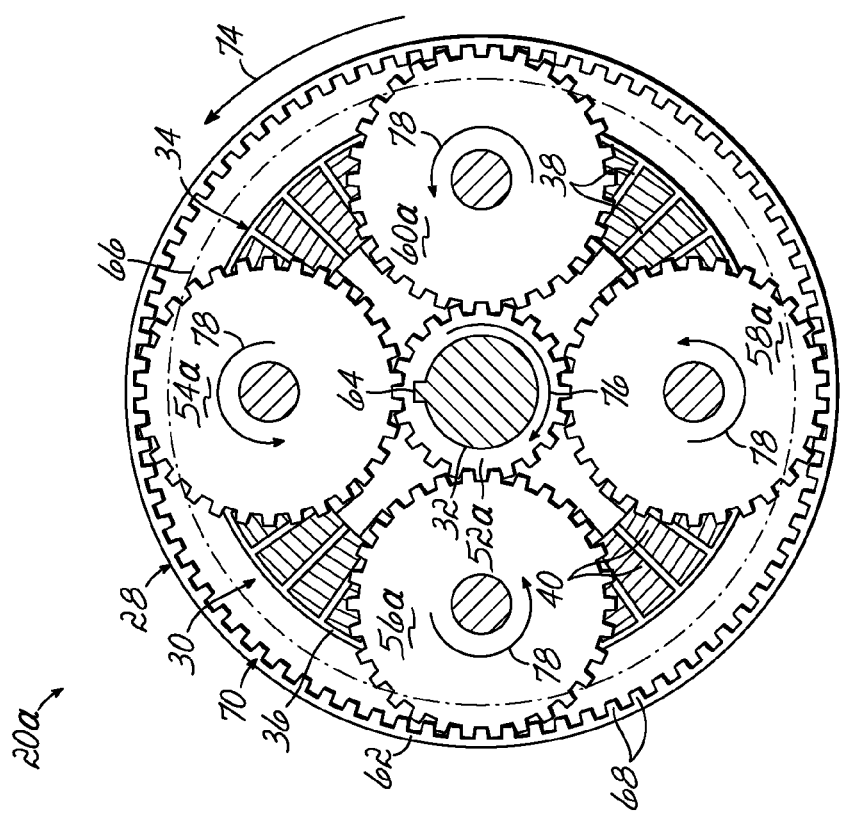
FIG. 6 is a cross-sectional view of the drive train for the assembled generator of FIG. 5.
Figure 5:
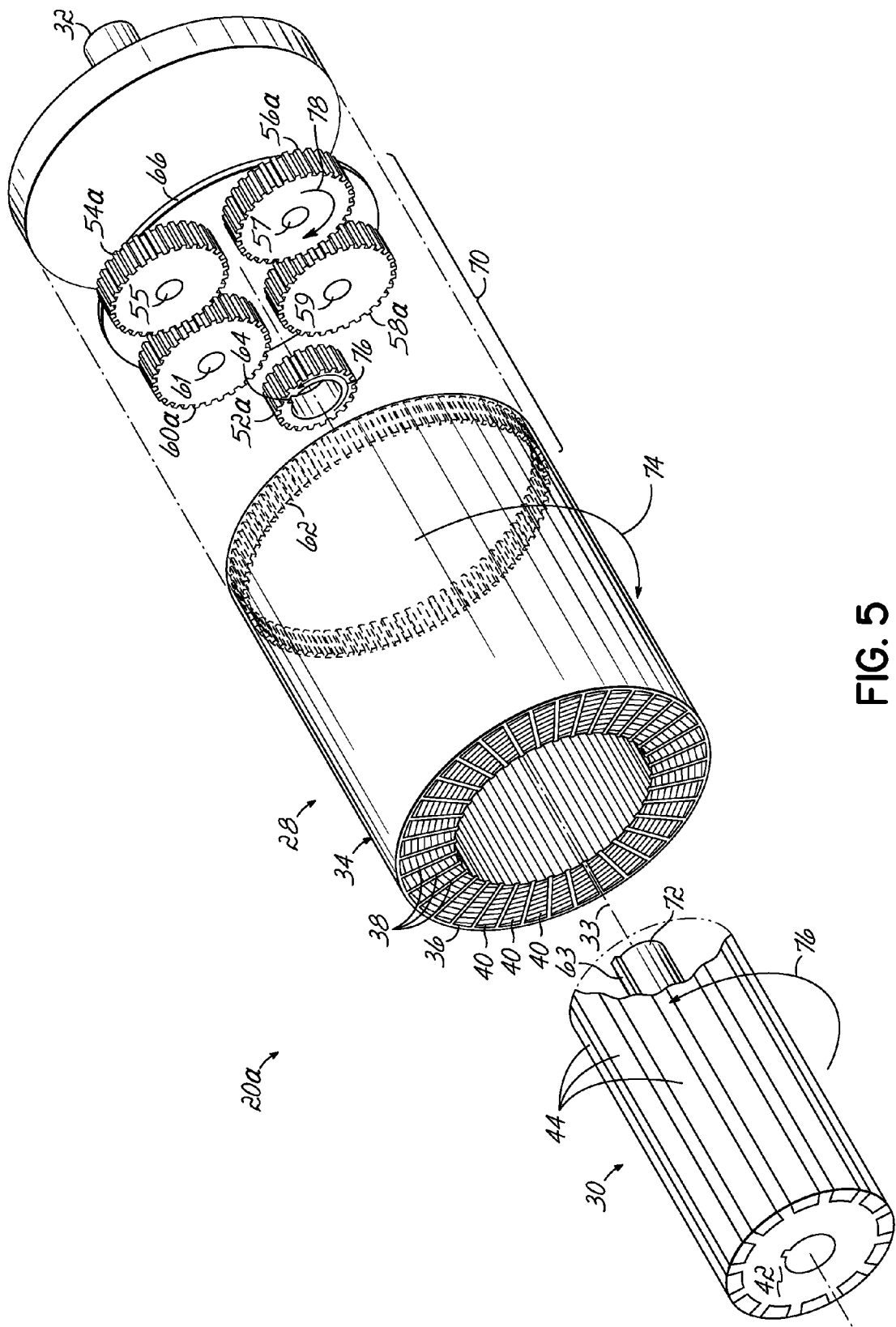
FIG. 5 is an exploded perspective view similar to FIG. 3 of a generator with a drive train in accordance with an alternative embodiment of the invention.

With reference to FIGS. 5 and 6 in which like reference numerals refer to like features in FIG. 3 and in accordance with an alternative embodiment, a generator 20a is generally similar in construction and function to generator 20 (FIGS. 3, 4) but is modified such that the stator assembly 28 is directly driven by the rotary drive shaft 32 extending from the rotor 16. The generator 20a includes a drive train 70 that operates to drive the rotation of the rotor assembly 30 indirectly with mechanical energy from the rotary drive shaft 32. The rotary drive shaft 32 is mechanically coupled with the stator frame 34 of the stator assembly 28. A sun gear 52a is secured to a shaft 72 to which the rotor assembly 30 is also irrotationally affixed.

The drive shaft 32 transfers torque to the outer annulus gear 62 and thereby causes the outer annulus gear 62 to rotate in a direction 74 about the longitudinal axis 33. As a result, the drive shaft 32 and outer annulus gear 62 rotate with a common angular velocity. The planetary carrier 66 of drive train 70 is locked and stationary relative to the longitudinal axis 33 so that the planet gears 54a, 56a, 58a, 60a do not revolve about the sun gear 52a. However, in contrast to drive train 50, the rotation of the outer annulus gear 62 in direction 74 supplies an input that powers the drive train 70, and the sun gear 52a is an output receiving power within the drive train 70. In this manner, an input rotation of the rotary drive shaft 32 in direction 74 transferred to outer annulus gear 62 is converted into an output rotation of the sun gear 52a in the opposite direction 76. The planet gears 54a, 56a, 58a, 60a of drive train 70 each spin at a rate determined by a gear ratio of the number of teeth 68 on the outer annulus gear 62 to the number of teeth on each of the planet gears 54a, 56a, 58a, 60a. The planet gears 54a, 56a, 58a, 60a and outer annulus gear 62 rotate in a common rotation direction. For example, clockwise rotation of the outer annulus gear 62 in the direction 74 produces clockwise rotation of the planet gears 54a, 56a, 58a, 60a in a direction 78 and in a proportion determined by the gear ratio.

Rotation of the planet gears 54a, 56a, 58a, 60a in direction 78 drives the sun gear 52a in direction 76 at a rate given by a gear ratio of the number of teeth on the sun gear 52a to the number of teeth on each of the planet gears 54a, 56a, 58a, 60a and in the opposite rotational direction (e.g., the representative clockwise rotation of the planet gears 54a, 56a, 58a, 60a in direction 78 produces counterclockwise rotation of the sun gear 52a in direction 76 at the rate determined by the gear ratio). With the planetary carrier 66 locked, rotation of the outer annulus gear 62 in one direction 74 causes the sun gear 52a to rotate in the opposite direction 76 with a gear ratio given by the number of teeth on the sun gear 52a to the number of teeth on the outer annulus gear 62. So, one full rotation of the outer annulus gear 62 in direction 74 produces more than one rotation of sun gear 52a in direction 76 specified by a fraction equal to this gear ratio.

The relative rotation of the rotor assembly 30 and the stator assembly 28 in opposite directions 76, 78, when the generator 20a is operating, develops a relative angular velocity between the rotor and the stator assemblies 28, 30. According to the physical laws governing rigid body dynamics, the relative angular velocity is given by the vector sum of the angular velocity at which the rotor assembly 30 is rotating and the angular velocity at which the stator assembly 28 is rotating. The introduction of the drive train 70 into the generator 20a provides an effective angular velocity at an equivalent angular velocity for the rotary drive shaft 32 that is comparatively greater than the angular velocity of the rotor assembly in a conventional type of generator in which the stator assembly 28 is stationary. Stated differently, the enhanced angular velocity for an equivalent shaft torque received from the rotor 16 increases the output power at that equivalent shaft torque.

The generators 20, 20a are representative electrical machines that convert mechanical energy to electrical energy. The stator and rotor assemblies 28, 30 cooperate to convert mechanical energy received from the rotor 16 into electrical energy so that the kinetic energy of the wind is harnessed for power generation. Specifically, the relative rotation between the magnetic poles 44 of the rotor assembly 30 and the armature windings 40 of the stator assembly 28 induces an electrical current in each of the armature windings 40 consistent with Faraday's Law and Lenz's Law. The reverse conversion of electrical energy into mechanical energy is done by a different type of electrical machine, namely a motor, that has a similar construction and that may benefit from the introduction of one of the drive trains 50, 70 of the various embodiments of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "composed of", or variants thereof are used in either the detailed description or the claims, such terms are intended to be inclusive in a manner similar to the term "comprising."

It will be understood that when an element is described as being "connected" or "coupled" to or with another element, it can be directly connected or coupled to the other element or, instead, one or more intervening elements may be present. In contrast, when an element is described as being "directly connected" or "directly coupled" to another element, there are no intervening elements present. When an element is described as being "indirectly connected" or "indirectly coupled" to another element, there is at least one intervening element present.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

What is claimed is:

1. An electrical machine for use with a wind turbine, the electrical machine comprising:
    a first rotatable member coupled with the rotor of the wind turbine, the first rotatable member configured to be rotated in a first direction by the rotor of the wind turbine;
    a second rotatable member arranged relative to the first rotatable member; and
    a gear train mechanically coupling the rotor of the wind turbine with the second rotatable member, the gear train driven by the rotor of the wind turbine to rotate the second rotatable member relative to the first rotatable member in a second direction counter to the first direction,
    wherein one of the rotatable members comprises a plurality of circumferentially distributed magnetic poles and the other rotatable member comprises a plurality of armature windings, wherein the first and second rotatable members have a concentric arrangement with one of the rotatable members disposed radially inside the other rotatable member, wherein the gear train includes an epicyclic arrangement of gears including a sun gear and an annular outer gear, and wherein one of the rotatable members carries the sun gear and the other rotatable member carries the annular outer gear.

2. The electrical machine of claim 1, wherein the gear train further includes a non-rotatable planetary carrier supporting a plurality of planetary gears, and wherein the sun gear and the first rotatable member are driven by a rotary drive shaft, the annular outer gear is carried by the second rotatable member, the sun gear receives torque vectored in the first direction from the shaft, and the annular outer gear receives a torque vectored in the second direction from the planetary gears.

3. The electrical machine of claim 1, wherein the gear train further includes a non-rotatable planetary carrier supporting a plurality of planetary gears, and wherein the annular outer gear and the first rotatable member are driven by the rotor of the wind turbine, the sun gear is carried by the second rotatable member, and the annular outer gear receives torque vectored in the second direction from the planetary gears.

4. The electrical machine of claim 1, wherein the first rotatable member is disposed radially inside the second rotatable member.

5. The electrical machine of claim 1, wherein the second rotatable member is disposed radially inside the first rotatable member.

6. A wind turbine comprising:
    a tower;
    a nacelle supported by the tower;
    a rotor supported by the nacelle, the rotor configured to convert wind energy into mechanical energy that rotates about a longitudinal axis; and
    a generator including a first rotatable member mechanically coupled with the rotor, a second rotatable member arranged relative to the first rotatable member, and a gear train mechanically coupling the rotor with the second rotatable member, the first rotatable member configured to be rotated in a first direction by the rotor, and the gear train driven by the rotor to rotate the second rotatable member relative to the first rotatable member in a second direction counter to the first direction,
    wherein one of the rotatable members comprises a plurality of circumferentially distributed magnetic poles and the other rotatable member comprises a plurality of armature windings, wherein the first and second rotatable members have a concentric arrangement with one of the rotatable members disposed radially inside the other rotatable member, wherein the gear train includes an epicyclic arrangement of gears including a sun gear and an annular outer gear, and wherein one of the rotatable members carries the sun gear and the other rotatable member carries the annular outer gear.

7. The wind turbine of claim 6, further comprising a rotary drive shaft connecting the first rotatable member with the rotor.

8. The wind turbine of claim 6, further comprising a gearbox connecting the first rotatable member with the rotor.

9. The wind turbine of claim 6, wherein the first rotatable member is disposed radially inside the second rotatable member.

10. The wind turbine of claim 6, wherein the second rotatable member is disposed radially inside the first rotatable member.

11. A method of operating an electrical machine having first and second rotatable members configured to convert mechanical energy received from a rotor of a wind turbine into electrical energy, the method comprising:
    rotating a first rotatable member in a first direction using torque from the rotor of the wind turbine;

driving a second rotatable member to rotate in a second direction counter to the first direction using the torque from the rotor of the wind turbine; and using the relative rotation of the first and second rotatable members to convert the mechanical energy received from the rotor into the electrical energy, wherein one of the rotatable members comprises a plurality of circumferentially distributed magnetic poles and the other rotatable member comprises a plurality of armature windings, wherein driving the second rotatable member to rotate in the second direction comprises transferring a portion of the torque from the rotor though a first gear carried by the first rotatable member and a plurality of planetary gears to a second gear carried by the second rotatable member, wherein the first gear is one of a sun gear and an annular outer gear, and the second gear is the other of the sun gear and the annular outer gear.

12. The method of claim 11, further comprising operating the rotor to convert wind energy into the mechanical energy.

13. The method of claim 11, wherein the first gear carried by the first rotatable member is the sun gear, and the second gear carried by the second rotatable member is the annular outer gear.

14. The method of claim 11, wherein the first gear carried by the first rotatable member is the annular outer gear, and the second gear carried by the second rotatable member is the sun gear.

* * * * *